United States Patent
He et al.

(10) Patent No.: US 10,137,792 B2
(45) Date of Patent: Nov. 27, 2018

(54) VEHICLE CONTROL BASED ON LITHIUM PLATING DETECTION IN ELECTRIFIED VEHICLE BATTERY

(71) Applicant: Ford Global Technologies, LLC, Dearborn, MI (US)

(72) Inventors: Chuan He, Northville, MI (US); Jeffrey Cowell, Canton, MI (US); Feng Li, Troy, MI (US); Xu Wang, Northville, MI (US); Ruiqi Mao, Dearborn, MI (US); Brandon Swisher, Brownstown, MI (US); Haiyan Chen, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 293 days.

(21) Appl. No.: 15/001,520

(22) Filed: Jan. 20, 2016

(65) Prior Publication Data
US 2017/0203660 A1    Jul. 20, 2017

(51) Int. Cl.
*B60L 11/18* (2006.01)
*B60L 3/00* (2006.01)
(Continued)

(52) U.S. Cl.
CPC ......... *B60L 11/1816* (2013.01); *B60L 3/0046* (2013.01); *B60L 3/12* (2013.01);
(Continued)

(58) Field of Classification Search
CPC .......................... B60L 11/1816; B60L 11/182
(Continued)

(56) References Cited

U.S. PATENT DOCUMENTS 5,729,116 A    3/1998  Tsenter
5,998,969 A   12/1999  Tsuji et al.
(Continued)

FOREIGN PATENT DOCUMENTS

WO    2015077669 A1    5/2015

OTHER PUBLICATIONS

J.C. Burns, D.A. Stevens, and J.R. Dahn; In-Situ Detection of Lithium Plating Using High Precision Coulometry; Journal of the Electrochemical Society; Jan. 19, 2015; pp. 959-964; Department of Physics and Atmospheric Science, Dalhousie University, Halifax, Nova Scotia B3H 4R2, Canada.
(Continued)

*Primary Examiner* — Sun Lin
(74) *Attorney, Agent, or Firm* — David B. Kelley; Brooks Kushman P.C.

(57) ABSTRACT

A vehicle having a traction battery with at least one cell includes a controller coupled to the traction battery and programmed to control charging and discharging of the traction battery in response to detecting lithium plating in the at least one cell indicated by a ratio of differential voltage of the at least one cell as a function of time to cell charging rate of the at least one cell. In various embodiments, the ratio is compared to a threshold associated with current battery state of charge to indicate lithium plating when the ratio is below the threshold. Lithium plating can also be detected based on a measured cell open circuit voltage (OCV) relative to a previously stored OCV value. In various embodiments, the measured OCV value is calculated based on a measured cell voltage and current, and a previously stored cell internal resistance.

18 Claims, 4 Drawing Sheets

(51) Int. Cl.
*B60L 3/12* (2006.01)
*H02J 7/00* (2006.01)
*H01M 10/44* (2006.01)
*H01M 10/48* (2006.01)
*H01M 10/42* (2006.01)

(52) U.S. Cl.
CPC ......... *B60L 11/182* (2013.01); *B60L 11/1866* (2013.01); *H01M 10/441* (2013.01); *H01M 10/482* (2013.01); *H02J 7/0013* (2013.01); *B60L 2240/545* (2013.01); *B60L 2240/547* (2013.01); *H01M 2010/4271* (2013.01); *H01M 2220/20* (2013.01)

(58) Field of Classification Search
USPC ........................................................ 320/131
See application file for complete search history.

(56) References Cited

U.S. PATENT DOCUMENTS

| | | | |
|---|---|---|---|
| 6,040,685 A | | 3/2000 | Tsenter et al. |
| 6,366,056 B1 | | 4/2002 | Podrazhansky et al. |
| 7,982,436 B2 | * | 7/2011 | Randall et al. ....... G06F 1/1626 320/113 |
| 8,901,885 B2 | | 12/2014 | Kelty et al. |
| 2009/0278500 A1 | * | 11/2009 | To et al. ............. B60L 11/1851 320/134 |
| 2011/0172939 A1 | * | 7/2011 | Uprety et al. ..... G01R 31/3624 702/63 |
| 2011/0298417 A1 | | 12/2011 | Stewart et al. |
| 2015/0147614 A1 | * | 5/2015 | Wang et al. ....... G01R 31/3624 429/93 |
| 2017/0190262 A1 | * | 7/2017 | Jin et al. ............. B60L 11/1861 |

OTHER PUBLICATIONS

Mathias Petzl and Michael A. Danzer; Nondestructive detection, characterization, and quantification of lithium plating in commercial lithium-ion batteries; Journal of Power Sources 254; Aug. 20, 2013; pp. 80-87.

\* cited by examiner

VEHICLE CONTROL BASED ON LITHIUM PLATING DETECTION IN ELECTRIFIED VEHICLE BATTERY

CROSS-REFERENCE TO RELATED APPLICATIONS

This application includes subject matter similar to commonly owned U.S. Ser. No. 15/001,562, filed Jan. 20, 2016; and U.S. Ser. No. 15/001,618, filed Jan. 20, 2016.

TECHNICAL FIELD

This disclosure relates to detection of lithium plating in a vehicle battery for the control system of an electrified vehicle.

BACKGROUND

Electrified vehicles, such as hybrid, plug-in hybrid, and battery electric vehicles use an electric machine powered by a traction battery to drive the vehicle powertrain. Charging and discharging of the battery results in electrochemical processes that affect the charge available to power the vehicle and may vary with ambient and operating conditions such as battery state of charge (SOC), temperature, battery cell balance, and charging/discharging rate or current, for example. In lithium-ion (Li-ion) batteries, metallic lithium may be deposited on the negative electrodes of battery cells under some operating conditions, which may degrade battery capacity and charge availability and can lead to internal short circuits. Batteries are particularly susceptible to this process, referred to as lithium plating, under low operating temperature and high charging currents, although lithium plating may occur under other ambient and operating conditions.

SUMMARY

In various embodiments, a vehicle having a traction battery with at least one cell includes a controller coupled to the traction battery and programmed to control charging and discharging of the traction battery in response to lithium plating of the at least one cell indicated by a ratio of differential voltage of the at least one cell as a function of time to cell charging rate of the at least one cell. The cell charging rate may correspond to cell current. The controller may be further programmed to decrease the cell charging rate in response to lithium plating. In various embodiments, the controller is further programmed to control the cell charging rate in response to the ratio crossing an associated threshold. The associated threshold may vary based on a traction battery state of charge.

In one embodiment, a vehicle includes a traction battery having a plurality of cells and a controller in communication with the traction battery and programmed to control the traction battery in response to detection of lithium plating in at least one cell of the plurality of cells based on a differential cell voltage of the at least one cell relative to an associated threshold. The controller may be programmed to control traction battery current in response to detection of lithium plating based on a difference between a measured open circuit voltage of the at least one cell, where the associated threshold is a previously stored open circuit voltage value. The measured open circuit voltage may be based on a measured cell voltage, a measured cell current, and a previously stored or online estimated cell internal resistance.

In another embodiment, the controller is programmed to control traction battery current in response to detection of lithium plating based on a ratio of the differential cell voltage and cell current during charging of the traction battery. The controller may be further programmed to control the traction battery in response to detection of lithium plating based on comparison of the ratio as a function of time to a previously stored ratio pattern. The controller may be programmed to control charging and discharging of the traction battery in response to the detection of lithium plating by reducing charging current, warm up the battery with external heating or cycle the battery to generate heat using cell internal resistance or reversing traction battery current, for example.

Embodiments may also include a method implemented by a vehicle controller in a vehicle having a traction battery. The method may include controlling, by the controller, traction battery current in response to lithium plating of one or more traction battery cells indicated by a ratio of a) cell voltage change to b) a system identification method to detect the special pattern that is associated with lithium plating or cell charging rate in response to the ratio crossing an associated threshold that may depend on one or more ambient or battery conditions, such as battery state of charge, for example. Controlling the traction battery current may include reducing the traction battery current.

Embodiments according to the present disclosure may provide one or more advantages. For example, online non-destructive detection of lithium plating facilitates battery and/or vehicle control to mitigate irreversible lithium plating to extend battery life and capacity. Various embodiments provide lithium plating detection that is robust to variations of the battery open circuit voltage curve to provide accurate detection under varying operating conditions. Strategies according to one or more embodiments use existing vehicle and/or battery sensors to detect lithium plating such that added sensors or hardware is not required.

The above advantages and other advantages and features associated with various embodiments will be readily apparent to those of ordinary skill in the art from the following detailed description when taken in connection with the accompanying drawings.

DETAILED DESCRIPTION

As required, detailed embodiments are disclosed herein; however, it is to be understood that the disclosed embodiments are merely representative of the claimed subject matter and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure may include various internal and external circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of discrete passive and active components such as resistors, capacitors, transistors, amplifiers, analog/digital converters (ADC or A/D converters), microprocessors, integrated circuits, non-transitory memory devices (e.g., FLASH, random access memory (RAM), read only memory (ROM), electrically programmable read only memory (EPROM), electrically erasable programmable read only memory (EEPROM), or other suitable variants thereof) and software which cooperate with one another to perform operation(s) disclosed herein. In addition, any one or more of the electric devices may be configured to execute a computer program that is embodied in a non-transitory computer readable storage medium that includes instructions to program a computer or controller to perform any number of the functions as disclosed.

Figure 1:
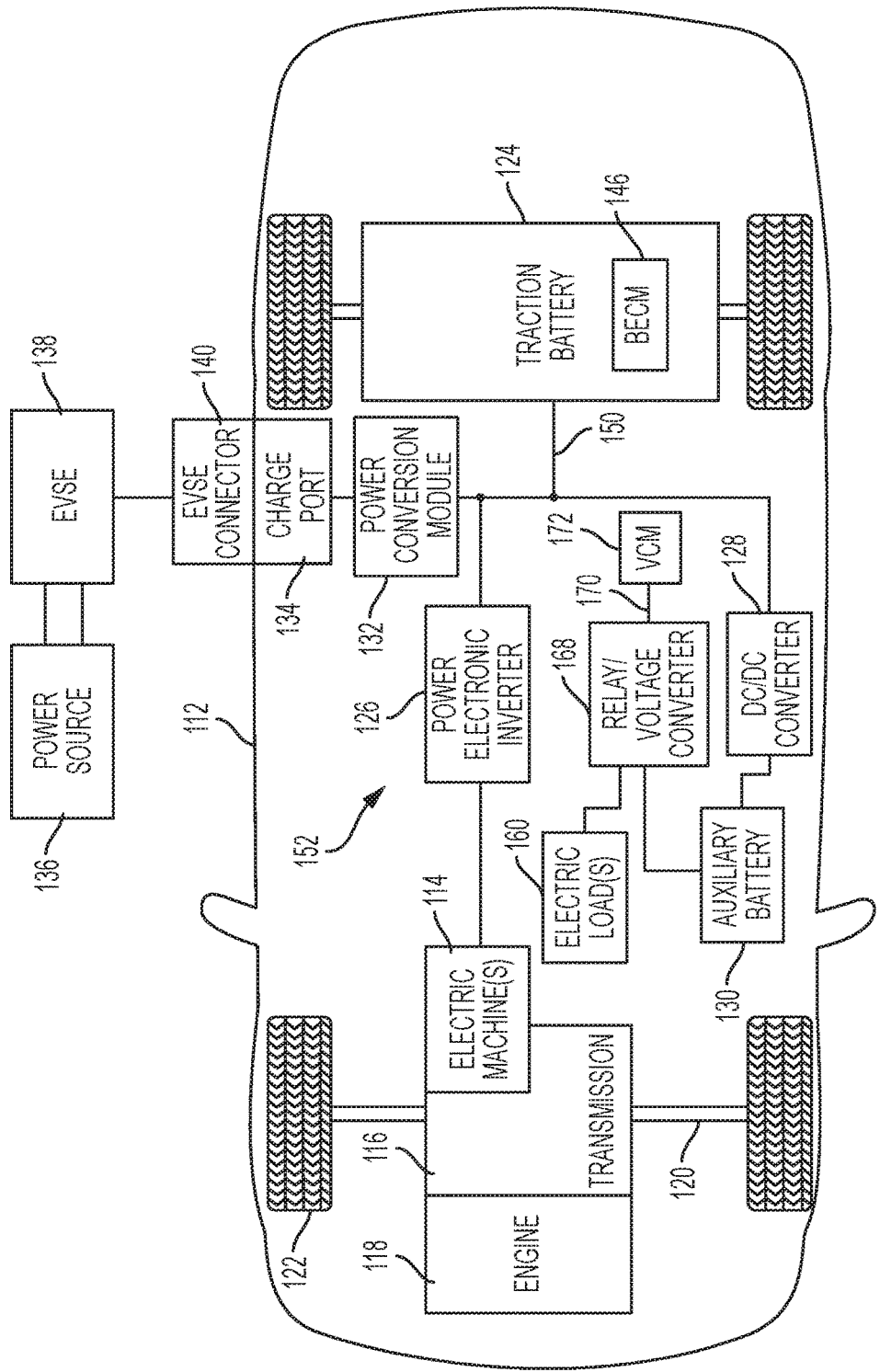
FIG. 1 is a block diagram illustrated an electrified vehicle having lithium plating detection and control in a representative embodiment.

FIG. 1 is a block diagram of a representative electrified vehicle embodiment having at least one controller that controls the vehicle and/or battery based on detection of lithium plating in the vehicle battery. While a plug-in hybrid vehicle having an internal combustion engine is illustrated in this representative embodiment, those of ordinary skill in the art will recognize that the disclosed embodiments illustrating detection of lithium plating and control of a vehicle and/or vehicle battery in response thereto may also be utilized in other types of electrified vehicles. The systems and methods for lithium plating detection and control illustrated in the representative embodiments are independent of the particular vehicle powertrain. Representative vehicle applications may include hybrid vehicles, electric vehicles, or any other type of vehicle having a battery subject to performance degradation associated with lithium plating.

In the representative application illustrated in FIG. 1, a plug-in hybrid-electric vehicle 112 may include one or more electric machines 114 mechanically connected to a hybrid transmission 116. The electric machines 114 may be capable of operating as a motor or a generator. For hybrid vehicles, a transmission 116 is mechanically connected to an internal combustion engine 118. The transmission 116 is also mechanically connected to a drive shaft 120 that is mechanically connected to the wheels 122. The description herein is equally applicable to a battery electric vehicle (BEV), where the hybrid transmission 116 may be a gear box connected to an electric machine 114 and the engine 118 may be omitted as previously described. The electric machines 114 can provide propulsion and deceleration capability whether or not the engine 118 is operating. The electric machines 114 also act as generators and can provide fuel economy benefits by recovering energy that would normally be lost as heat in the friction braking system.

For hybrid or electric vehicle applications, a traction battery or traction battery pack 124 stores energy in a plurality of individual battery cells connected together to provide a desired voltage and charge capacity for the electric machines 114. In one embodiment, battery pack 124 includes an array of lithium-ion battery cells. Lithium plating refers to the process where metallic lithium is deposited on the negative electrode of the battery cells and may lead to long-term effects such as capacity loss, increased impedance, decrease in efficiency, and in some cases an internal short circuit, for example, depending on the particular structural characteristics of the deposited lithium. Some degree of plating may be reversed during a process referred to as stripping. As such, various embodiments according to the present disclosure utilize a vehicle or battery controller to detect lithium plating and control the vehicle and/or traction battery in response to detection of lithium plating to reduce or eliminate lithium plating. Control of battery charging and discharging may be used to strip reversibly plated anodes as well as to reduce or eliminate plating. Battery cells are particularly susceptible to plating during charging at low temperatures, high state of charge (SOC), and high charging rates (high current). As such, control of the battery and/or vehicle may include controlling traction battery current in response to detection of lithium plating. Various strategies may be used to detect lithium plating with representative strategies illustrated and described with reference to FIGS. 2-4.

Vehicle battery pack 124 typically provides a high voltage DC output to a high voltage bus 150, although the voltage and current may vary depending on particular operating conditions and loads. The traction battery pack 124 is electrically connected to one or more external circuits 152, which may include a power electronics or inverter circuit 126, a DC/DC converter circuit 128 and/or a power conversion module or circuit 132, for example. One or more contactors may isolate the traction battery pack 124 from other components when opened, and connect the traction battery pack 124 to the other components when closed. Traction battery pack 124 may include various internal circuits for measuring and monitoring various operating parameters including cell current and individual cell voltage. Parameters such as voltage, current and resistance for a battery cell or a group of battery cells (sometimes referred to as a block or brick) may be monitored and/or controlled by the BECM 146.

In addition to providing energy for propulsion, the traction battery pack 124 may provide energy for other external circuits 152 connected to the high voltage bus 150. The power distribution system of vehicle 112 may also include a DC/DC converter module or circuit 128 that converts the high voltage DC output of the traction battery 124 to a low voltage DC supply that is compatible with other vehicle loads that may be directly connected. Other external high voltage circuits or loads, such as those for cabin or component heaters, may be connected directly to the high voltage bus 50 without the use of a DC/DC converter module 128.

Vehicle 112 may also include an auxiliary battery 130 having a relatively lower nominal voltage (such as 24V or 48V, for example) and may be implemented using different battery chemistries than the traction battery pack 124. Auxiliary battery 130 may also be referred to as a low-voltage battery, starter battery or simply the vehicle battery for various applications. Auxiliary battery 130 may be used to power various low-voltage components, controllers, modules, motors, actuators, sensors, etc. generally represented by electric loads 160. One or more relay/voltage converters 168 may be used to power vehicle electrical load(s) 160. In this embodiment, relay/voltage converter 168 includes a relay controlled by a relay input signal 170 provided by a vehicle control module (VCM) 172, which may also be used to directly or indirectly control the vehicle and/or traction battery 124 using the battery energy control module (BECM) 146.

Traction battery pack 124 may be recharged by an external power source 136. The external power source 136 may be a connection to an electrical outlet connected to the power grid. The external power source 136 may be electrically connected to electric vehicle supply equipment (EVSE) 138. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be electrically connected to a charger or on-board power conversion module 132. Alternatively, various components described as being electrically connected may transfer power using a wireless inductive coupling.

The various components illustrated in FIG. 1 may have one or more associated controllers, control modules, and/or processors such as VCM 172 to detect traction battery lithium plating and to control and monitor the operation of the various vehicle and traction battery components. The controllers may communicate via a serial peripheral interface (SPI) bus (e.g., Controller Area Network (CAN)) or via discrete conductors. Various operating parameters or variables may be broadcast or published using the CAN or other conductors for use by vehicle control modules or submodules in controlling the vehicle or vehicle components, such as the traction battery pack 124 or electric load(s) 160, for example. One or more controllers may operate in a stand-alone manner without communication with one or more other controllers. The controllers may include a Battery Energy Control Module (BECM) 146 to control various charging and discharging functions, battery cell charge balancing, battery pack voltage measurements, individual battery cell voltage measurements, battery over-charge protection, battery over-discharge protection, battery end-of-life determination, lithium plating detection, battery current polarity or direction (charging and discharging), etc. The controllers may include and/or communicate with various types of non-transitory computer readable storage media including persistent and temporary storage devices to store control logic, algorithms, programs, operating variables, and the like. In one embodiment, the BECM 146 may communicate with memory for storing values associated with battery cell desired open circuit voltage values, thresholds, or patterns. Similarly, BECM 146 may communicate with memory having values store in lookup tables or arrays associated with battery cell internal resistance based on battery parameters such as temperature, SOC, age, etc.

Figure 2:
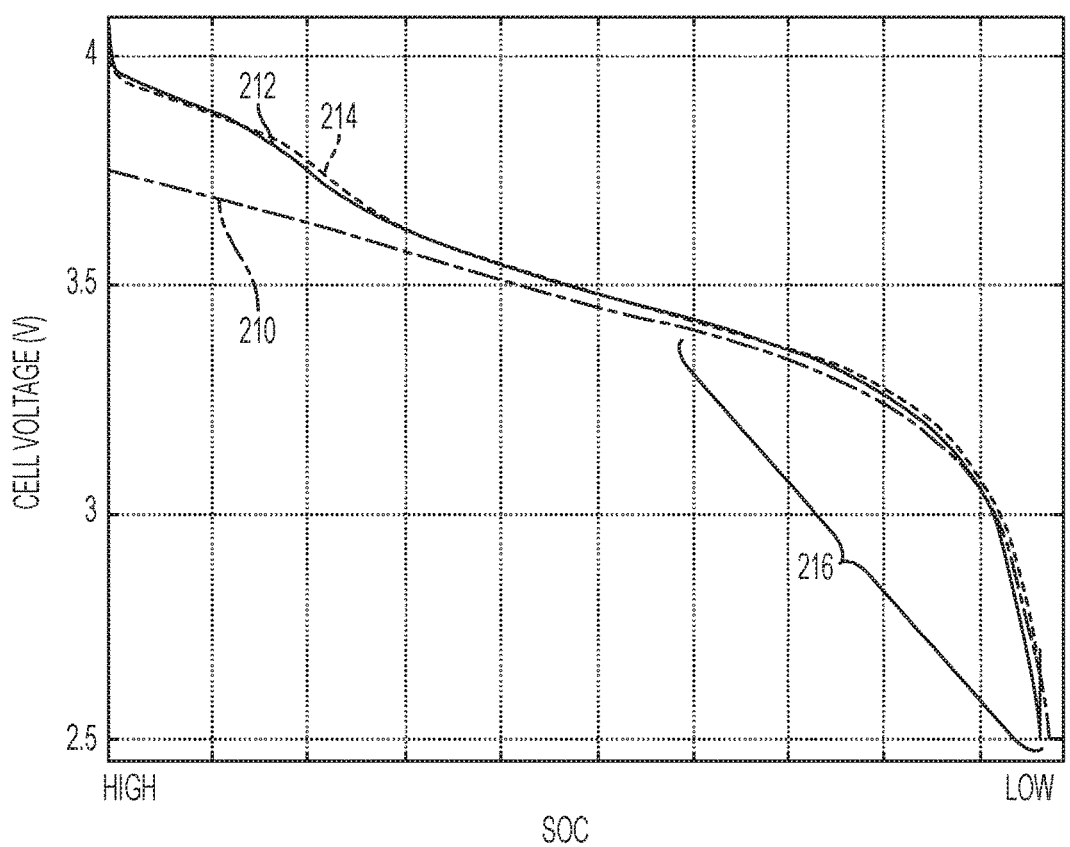
FIG. 2 is a graph illustrating cell voltage as a function of SOC for unplated and plated battery cells for use in detecting lithium plating according to a representative embodiment.

FIG. 2 is a graph illustrating cell voltage as a function of SOC for unplated and plated battery cells for use in detecting lithium plating according to a representative embodiment. The graph of FIG. 2 was generated using empirical data for representative lithium-ion cells that may be used in a battery pack in an electrified vehicle such as the plug-in hybrid electric vehicle illustrated in FIG. 1. Data represented by line 210 correspond to cell voltage during discharging over SOC for a normal lithium-ion cell with little or no plating. Data represented by lines 212, 214 correspond to cell voltages during discharging as a function of SOC for lithium plated cells. As previously described, due to the chemical characteristics of lithium, when a battery cell is plated the battery cell open circuit voltage (OCV) will be higher than a cell OCV value that has no plating at the same SOC value.

During discharging, reversibly plated lithium may be stripped such that the discharge curves of OCV vs. SOC will be the same for plated and unplated cells. The low SOC portion of the curves generally indicated by reference numeral 216 after the end of the stripping process can be used to identify the plated cell SOC value.

In various embodiments, the expected or normal battery OCV, and/or the expected battery cell internal resistance for particular battery operating parameters, such as temperature, current, SOC, age, etc. may be estimated or stored in a memory in communication with the BECM 146. Battery plating may then be detected according to one representative embodiment based on a difference between a measured OCV of a least one cell and the previously stored expected OCV under similar operating conditions. The measured OCV can be calculated based on a measured battery cell voltage, current flow through the battery cell, and the battery cell internal resistance as calculated or previously stored in a memory associated with the battery control system according to:

$$OCV = V\_battery - I * R\_cell$$

where OCV represents the battery cell open circuit voltage (V), V_battery represents the measured battery cell voltage (V), I represents the current flow through the battery cell (A), and R_cell represents the battery cell internal resistance (ohms). Detection of lithium plating in at least one cell of the plurality of cells may be indicated based on a differential cell voltage of the at least one cell relative to an associated threshold as represented by:

$$\text{If } OCV_{measured} - OCV_{expected} > \text{Calibrated Threshold,}$$
$$\text{then the battery cell is plated.}$$

Alternatively, the measured OCV may be compared to an associated threshold representing a previously stored expected open circuit voltage value rather than computing a differential voltage as described above. Plating is then detected when the measured OCV crosses the threshold. One or more controllers in communication with the traction battery may be programmed to control the traction battery in response to detection of lithium plating, such as by controlling charging or discharging of one or more cells, reducing charging current to one or more cells, and reversing current to one or more cells, for example.

Figure 3:
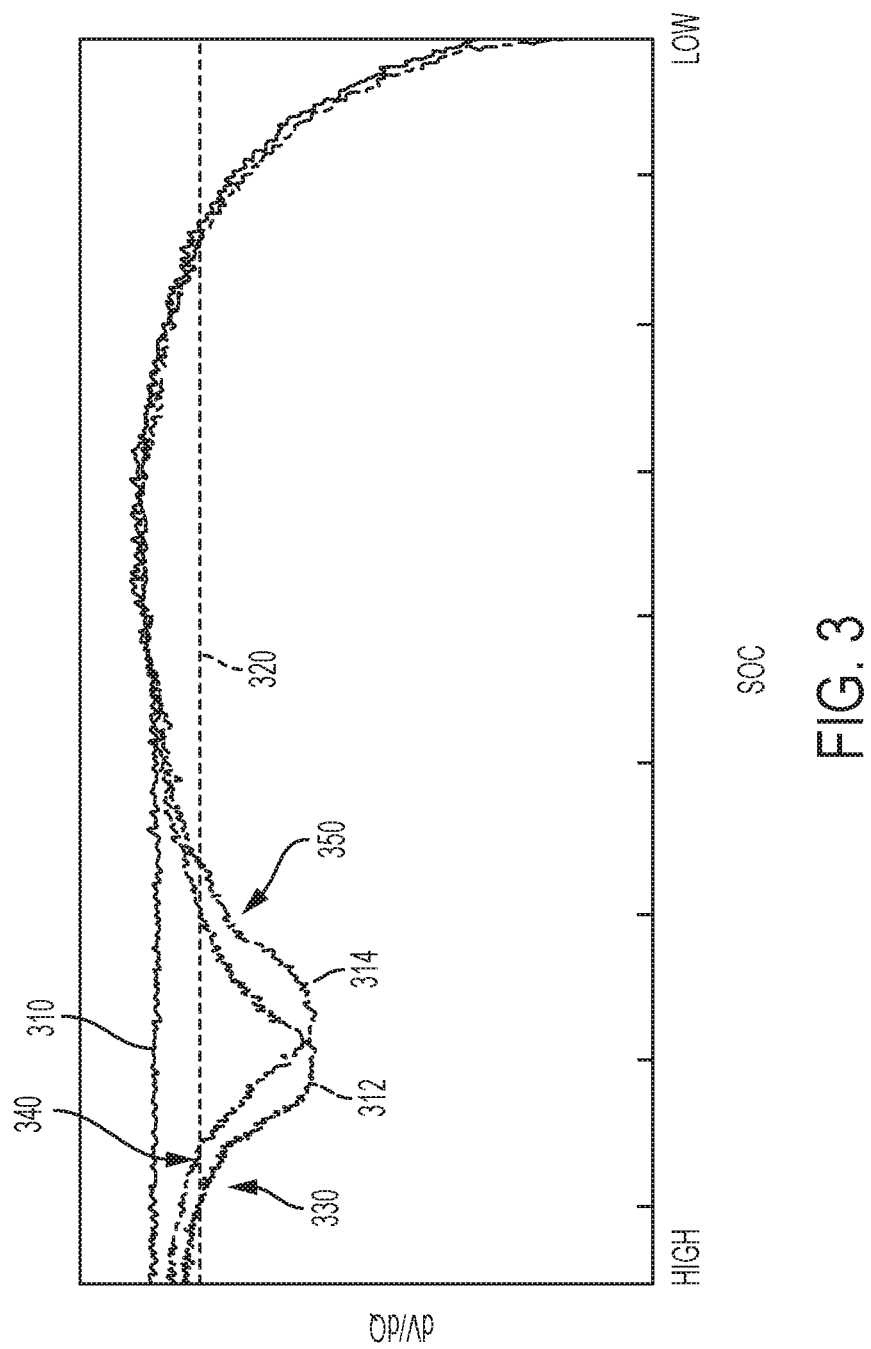
FIG. 3 is a graph illustrating a ratio of cell voltage changing rate to cell charging rate as a function of time for unplated and plated battery cells for use in detecting lithium plating according to a representative embodiment.

FIG. 3 is a graph illustrating a ratio of cell voltage changing rate to cell charging rate as a function of time for unplated and plated battery cells for use in detecting lithium plating according to a representative embodiment. Data represented by line 310 correspond to ratios for a battery cell with no lithium plating, while data represented by lines 312, 314 correspond to ratios for battery cells exhibiting lithium plating. Line 320 corresponds to a representative threshold that may be used to compare the ratios for detection of lithium plating such that lithium plating is detected in response to the calculated ratio crossing the threshold as indicated at 330 for line 312 and 340 for line 314, for example. Those of ordinary skill in the art will recognize that the particular threshold may vary based on battery and/or ambient operating parameters or conditions and may be stored in memory configured as a lookup table or may be computed based on a formula or equation using empirical data to generate a mathematical expression for the threshold. Similarly, the pattern formed by the data of one or more cells over time may be compared to a corresponding expected or desired pattern for a cell without plating with a mathematical or statistical parameter, such as correlation, used to detect plating. Similarly, other ratios may be computed and used to detect plating based on empirical data associated with plated cells.

As generally illustrated in FIG. 3, for a lithium plated battery cell, the ratio of cell voltage changing rate or differential voltage vs. cell charging rate, which may be indicated by cell current, for example, will have a clear transition when the plated lithium has stopped joining the reaction during the process. Since the ratio of cell voltage changing rate vs. cell charging rate as represented by lines 310, 312, and 314 is robust compared with a time based ratio, it is very robust for the lithium plating detection to various battery operating conditions. As such, lithium plating can be detected when the ratio of cell voltage changing rate vs. cell charging rate crosses a corresponding threshold.

As previously described with respect to FIG. 2, due to the chemical characteristics of lithium and the carbon anode, when a battery is plated, the battery cell OCV will be higher than normal battery open circuit voltage without plating. When the lithium stops joining the reaction, the cell OCV will go back to a normal OCV as generally indicated at 350, such that various embodiments use the ratio transition to detect cell plating. In various applications, battery cell voltage is measured inside the battery pack for individual cells or groups or bricks of cells such that the differential voltage for a particular cell or group of cells dV/dt can be calculated. The cell charging rate or rate of change of cell may be represented by the actual cell current (I) as represented by:

$$\frac{dQ}{dt} = I$$

The ratio of cell voltage changing rate vs. cell charge rate may be calculated by a vehicle or battery controller according to:

$$\text{ratio} = \frac{dV\_battery}{dQ} = \left(\frac{dV\_battery}{dt}\right) \Big/ \left(\frac{dQ}{dt}\right) = \left(\frac{dV}{dt}\right) \Big/ I$$

where Q represents the battery cell accumulated charge (Coulomb), V_battery represents measured battery cell voltage (V), and I represents current flow through the battery cell (A). To detect battery plating for current battery operating conditions, such as temperature, SOC, etc., the calculated ratio is compared to a corresponding threshold with cell plating indicated when the ratio crosses the threshold as previously described. Various pattern detection strategies may also be used to detect the pattern, including but not limited to fuzzy logic, neural networks, and/or various statistical or curve fitting analyses, etc. Filters may be applied before and/or after differential operation to reduce/eliminate signal noise.

Figure 4:
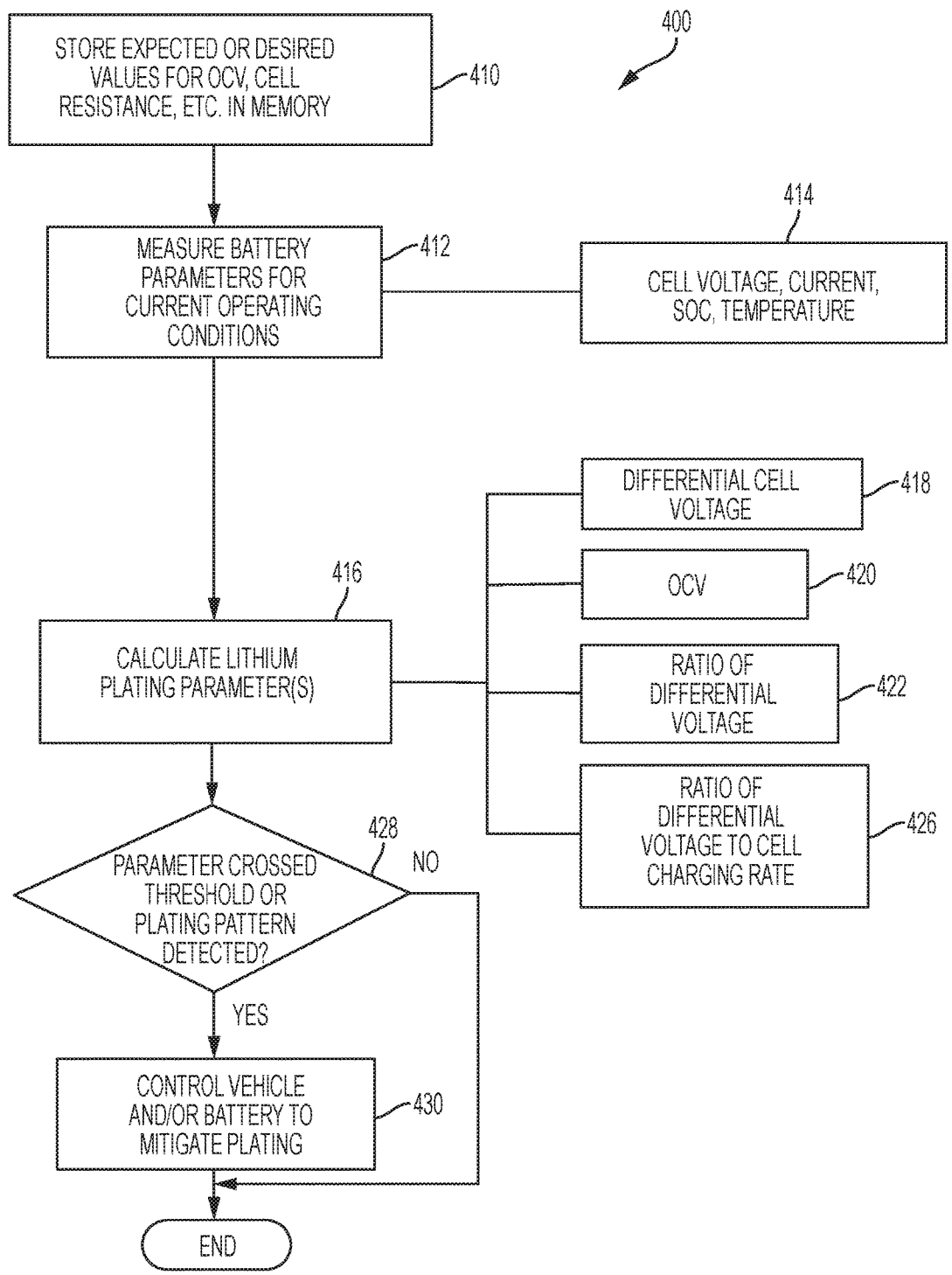
FIG. 4 is a flow chart illustrating operation of a vehicle or method for detecting lithium plating in a vehicle battery and controlling the vehicle or battery in response according to a representative embodiment.

FIG. 4 is a flow chart illustrating operation of a vehicle or method for detecting lithium plating in a vehicle battery and controlling the vehicle or battery in response thereto according to a representative embodiment. With regard to the processes, systems, methods, heuristics, etc. described herein, it should be understood that, although the steps of such processes, etc. may be described as occurring in an ordered sequence, such processes could be performed with the described steps completed in an order other than the order described herein. It should also be understood that certain steps could be performed simultaneously, that other steps could be added, or that certain steps described herein could be omitted while keeping with the teachings of this disclosure and being encompassed by the claimed subject matter. In other words, the descriptions of methods or processes are provided for the purpose of illustrating certain embodiments, and should be understood to be representative of one of many variations and not limited to only those shown or described.

As generally understood by those of ordinary skill in the art, the system or method may be implemented through a computer algorithm, machine executable code, or software instructions programmed into one or more suitable programmable devices associated with the vehicle, such as VCM 172, BECM 146, or another controller in communication with the vehicle computing system, or a combination thereof.

Operation of system or method 400 includes storing expected or desired values for various battery operating parameters as represented at 410 in a non-transitory computer readable medium or memory for subsequent use in detecting lithium plating. As previously described, battery parameter values may include expected or desired values for open circuit voltage of a representative cell or group of cells corresponding to current battery and/or ambient operating conditions. Internal battery cell resistance may also be stored for subsequent use in calculating OCV of a cell based on a measured cell voltage. Operation 410 may also include storing various programmable rules or logic for detecting or recognizing a pattern of parameter changes indicative of lithium plating. Current operating conditions are measured or otherwise determined for various battery parameters as represented by block 412. Representative parameters may include cell voltage, cell current, SOC, and temperature as represented at 414.

One or more lithium plating parameters or indicators are determined as represented by block 416. As previously described, lithium plating parameters or indicators may be based on a differential cell voltage 418, which may include a differential OCV, for example. Alternatively, measured OCV may be calculated using measured cell current, voltage, and internal resistance as previously described and represented at 420. A ratio of differential voltage may be calculated as represented at 422, and may include a ratio of differential voltage or changing voltage to cell charging rate as represented at 426.

One or more lithium plating parameters may be compared to an associated threshold or pattern as represented at 428, with lithium plating indicated when the parameter crosses an associated threshold. If a plating pattern is detected or a plating parameter crosses an associated threshold as indicated at 428, control of the vehicle and/or battery is used to mitigate plating as represented at 430. This may include controlling battery charging or discharging, battery current direction or polarity, battery charging rate, etc. Vehicle and/or battery control may also include control of various other vehicle components that may affect battery charging, discharging, or temperature. For example, an internal or external heating source may be operated to increase battery temperature, electrical loads may be increased or decreased by controlling associated accessories, an internal combustion engine may be started or stopped, regenerative braking current may be increased or decreased, etc.

As those of ordinary skill in the art may recognize, the representative embodiments described may provide one or more advantages such as online non-destructive detection of lithium plating with associated control to mitigate irreversible lithium plating and associated performance degradation to extend battery life and capacity. Various embodiments provide lithium plating detection that is robust to variations of the battery open circuit voltage curve to provide accurate detection under varying operating conditions. Strategies according to one or more embodiments use existing vehicle and/or battery sensors to measure cell voltage and current and detect lithium plating such that added sensors or hardware is not required.

While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A vehicle comprising:
a traction battery having a plurality of cells; and
a controller in communication with the traction battery and programmed to control the traction battery in response to detection of lithium plating based on a difference between a measured open circuit voltage of at least one cell of the plurality of cells and a previously stored open circuit voltage value associated with current operating conditions.

2. The vehicle of claim 1 wherein the measured open circuit voltage is obtained based on a measured cell voltage, a measured cell current, and a previously stored cell internal resistance.

3. The vehicle of claim 1 wherein the controller is further programmed to control traction battery current in response to detection of lithium plating based on a ratio of a differential cell voltage and cell current of the at least one cell during charging of the traction battery.

4. The vehicle of claim 3 wherein the controller is further programmed to control the traction battery in response to detection of lithium plating based on a comparison of the ratio as a function of time to a previously stored ratio pattern.

5. The vehicle of claim 1 wherein the controller is further programmed to control charging and discharging of the traction battery in response to the detection of lithium plating.

6. The vehicle of claim 1 wherein the controller is further programmed to reduce charging current of the traction battery in response to the detection of lithium plating.

7. The vehicle of claim 1 wherein the controller is further programmed to reverse traction battery current in response to the detection of lithium plating.

8. A vehicle comprising:
a traction battery having a plurality of cells; and
a controller in communication with the traction battery and programmed to control the traction battery responsive to detection of lithium plating in at least one cell of the plurality of cells based on a differential cell voltage of the at least one cell relative to an associated threshold, wherein the controller is further programmed to identify a lithium plated cell based on a relationship between open circuit voltage and state of charge (SOC) of the traction battery for SOC values below a threshold after discharging of the traction battery for a predetermined time to allow completion of lithium stripping.

9. A vehicle having a traction battery with at least one cell, the vehicle comprising:
a controller coupled to the traction battery and programmed to control charging and discharging of the traction battery in response to lithium plating of the at least one cell indicated by a ratio of differential voltage of the at least one cell as a function of time to cell charging rate of the at least one cell.

10. The vehicle of claim 9, wherein the cell charging rate of the at least one cell corresponds to cell current of the at least one cell.

11. The vehicle of claim 9, the controller further programmed to decrease the cell charging rate of the at least one cell in response to lithium plating.

12. The vehicle of claim 9, the controller further programmed to compare the ratio to control the cell charging rate in response to the ratio crossing an associated threshold.

13. The vehicle of claim 9, the controller further programmed to control the traction battery in response to the ratio being less than an associated threshold.

14. The vehicle of claim 13, wherein the associated threshold varies based on a traction battery state of charge.

15. A method implemented by a vehicle controller in a vehicle having a traction battery, the method comprising:
controlling, by the vehicle controller, traction battery current in response to lithium plating of one or more traction battery cells indicated by a ratio of cell voltage change to cell charging rate crossing an associated threshold.

16. The method of claim 15 wherein the controlling the traction battery current comprises reducing the traction battery current.

17. The method of claim 15, wherein the associated threshold varying with respect to state of charge of the traction battery.

18. The method of claim 15, wherein the cell charging rate corresponds to cell current.

\* \* \* \* \*